United States Patent
Rosenblum

(10) Patent No.: US 11,683,312 B2
(45) Date of Patent: Jun. 20, 2023

(54) CLIENT DEVICE AUTHENTICATION TO A SECURE NETWORK

(71) Applicant: ARRIS Enterprises LLC, Suwanee, GA (US)

(72) Inventor: Michael Rosenblum, Arlington, MA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 647 days.

(21) Appl. No.: 16/184,999

(22) Filed: Nov. 8, 2018

(65) Prior Publication Data

US 2020/0153833 A1 May 14, 2020

(51) Int. Cl.
*H04L 9/40* (2022.01)
*H04W 12/06* (2021.01)
*H04W 12/08* (2021.01)
*H04W 48/02* (2009.01)

(52) U.S. Cl.
CPC ........ *H04L 63/101* (2013.01); *H04L 63/0876* (2013.01); *H04W 12/06* (2013.01); *H04W 12/08* (2013.01); *H04W 48/02* (2013.01); H04L 2463/082 (2013.01)

(58) Field of Classification Search
CPC .......................... H04L 63/101; H04L 63/0876
See application file for complete search history.

(56) References Cited

U.S. PATENT DOCUMENTS

| 5,655,219 | A  | * | 8/1997  | Jusa   | H04W 12/06 455/67.11 |
| 6,463,473 | B1 | * | 10/2002 | Gubbi  | H04L 63/10 709/225 |
| 7,496,754 | B2 | * | 2/2009  | Liu    | H04L 63/0236 380/247 |
| 8,649,297 | B2 | * | 2/2014  | Ahlers | H04L 41/08 370/255 |

(Continued)

FOREIGN PATENT DOCUMENTS

| CN | 105554756 | 5/2016 |
| CN | 107592639 | 1/2018 |

OTHER PUBLICATIONS

International Preliminary Report on Patentability and Written Opinion of the International Searching Authority dated May 11, 2021 in International (PCT) Application No. PCT/US2019/060472.

(Continued)

*Primary Examiner* — Ponnoreay Pich
(74) *Attorney, Agent, or Firm* — Wenderoth, Lind & Ponack, L.L.P.

(57) ABSTRACT

A method for authenticating an electronic client device for purposes of granting/denying access to a secure network is provided. The network device detects whether a client device requesting access to the secure network is a known client device on a list maintained by the network device or an unrecognized client device that is not on the list. If the client device is detected as being an unrecognized client device, the network device causes a message to be sent to a manager of the secure network. When a response is received, (Continued)

identification information of the unrecognized client device is automatically added to the list of known client devices by the network device. A network device is also provided.

20 Claims, 4 Drawing Sheets

(56) References Cited

U.S. PATENT DOCUMENTS

| | | | | |
|---|---|---|---|---|
| 8,782,741 B1* | 7/2014 | L'Heureux | ........... | H04L 63/123 |
| | | | | 726/3 |
| 9,306,810 B2* | 4/2016 | Oslund | ................ | H04W 12/08 |
| 9,961,079 B1* | 5/2018 | Wang | ................ | H04L 63/0876 |
| 9,967,099 B2* | 5/2018 | Hou | .................... | H04W 12/069 |
| 10,419,931 B1* | 9/2019 | Sohail | ................ | H04L 63/0823 |
| 10,891,372 B1* | 1/2021 | Shahbazi | ................ | G06F 21/35 |
| 2004/0054926 A1* | 3/2004 | Ocepek | ................... | H04L 61/10 |
| | | | | 726/28 |
| 2004/0187018 A1* | 9/2004 | Owen | .................... | H04L 9/321 |
| | | | | 713/184 |
| 2007/0130473 A1* | 6/2007 | Mazotas | ............ | H04L 63/0853 |
| | | | | 713/183 |
| 2007/0186106 A1* | 8/2007 | Ting | ................... | H04L 63/0815 |
| | | | | 713/168 |
| 2009/0122787 A1* | 5/2009 | Huotari | ............... | H04L 63/0853 |
| | | | | 370/352 |
| 2009/0133109 A1* | 5/2009 | Giles | ...................... | H04L 63/08 |
| | | | | 726/7 |
| 2012/0036557 A1 | 2/2012 | Li | | |
| 2012/0159165 A1* | 6/2012 | Schibuk | ................ | G06F 21/602 |
| | | | | 713/168 |
| 2012/0303810 A1* | 11/2012 | Kotha | ................... | H04L 63/101 |
| | | | | 709/225 |
| 2012/0317622 A1* | 12/2012 | Harjanto | ................. | G06F 21/44 |
| | | | | 726/4 |
| 2013/0014248 A1* | 1/2013 | McLaughlin | ....... | G06F 3/04883 |
| | | | | 726/17 |
| 2013/0326047 A1* | 12/2013 | Easty | ..................... | H04L 41/22 |
| | | | | 709/224 |
| 2015/0188949 A1* | 7/2015 | Mahaffey | .............. | H04W 12/37 |
| | | | | 726/1 |
| 2017/0332238 A1* | 11/2017 | Bansal | .................. | H04L 67/125 |
| 2018/0077022 A1* | 3/2018 | Van Oost | .............. | H04W 12/08 |
| 2018/0331837 A1* | 11/2018 | Uhr | ..................... | H04L 63/0428 |
| 2019/0166128 A1* | 5/2019 | Kurian | .................... | H04L 63/12 |
| 2019/0238591 A1* | 8/2019 | Shaw | ................. | H04L 63/0281 |
| 2020/0153833 A1* | 5/2020 | Rosenblum | ........... | H04W 12/08 |

OTHER PUBLICATIONS

International Search Report dated Feb. 18, 2020 in International (PCT) Application No. PCT/US2019/060472.
Office Action issued in European Patent Application No. 19836100.8 dated Mar. 20, 2023.

* cited by examiner

US 11,683,312 B2

CLIENT DEVICE AUTHENTICATION TO A SECURE NETWORK

BACKGROUND

WiFi networks, such as a wireless local area network (WLAN) at a home, residence facility, business, or the like, are typically password protected for the purpose of permitting intended electronic client devices of authorized users, having knowledge of the password, access to the private or secure network and for preventing unauthorized users or strangers, not having knowledge of the password, from gaining access to the network. Accordingly, in such a network, over-the-air interface typically occurs between an authorized wireless client device and a base station, such as a gateway, wireless router, access point, or other networking hardware device of a WLAN, and typically requires the client device to communicate the correct password to the base station before being given access to the network.

Unfortunately, network security systems relying solely on passwords may not necessarily provide a high level of security since even unskilled hackers have been known to be readily able to obtain or steal passwords in an unauthorized manner and thereby readily gain access to private or secure WiFi networks.

Although some gateways, routers, WiFi routers, modems, cable modems, and like network devices have been provided with various relatively-complicated security features, in many instances, beyond the password printed on a sticker on the gateway or like device, the additional security features are typically unused by the average network owner or responsible operator of a private or secure home network due to lack of ease in implementing the security features. As stated above, there are known flaws in WiFi password security systems that allow an unskilled hacker to readily retrieve a password and gain access to an otherwise private or private network.

SUMMARY

According to an embodiment, a method of authenticating an electronic client device for purposes of granting/denying access to a secure network is provided. The network device automatically detects whether a client device requesting access to the secure network is a known client device on a list maintained by the network device or an unrecognized client device that is not on the list. If the client device is detected as being an unrecognized client device, the network device automatically causes a message in electronic form to be sent to a manager of the secure network (i.e., to the manager's smartphone or like personal electronic device capable of receiving messages). The message is sent for purposes of seeking a response from the manager as to whether access to the unrecognized client device should be granted or denied. When the response from the manager is received by the network device, the network device automatically adds identification information of the unrecognized client device to the list of known client device and thereafter the client device is either granted or denied access depending upon the manager's response.

According to another embodiment, a network device of a secure network is provided. The network device has at least one processor configured to automatically detect whether a client device requesting access to the secure network is a known client device on a list maintained by the network device or an unrecognized client device that is not on the list. The at least one processor is configured to automatically cause a message in electronic form to be sent to a manager of the secure network when an unrecognized client device is detected to seek a response from the manager as to whether access to the unrecognized client device should be granted or denied. In addition, the at least one processor is configured to automatically add identification information of the unrecognized client device to the list of known client devices when the response is received and thereafter to either grant or deny access depending upon the manager's response.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Figure 1:
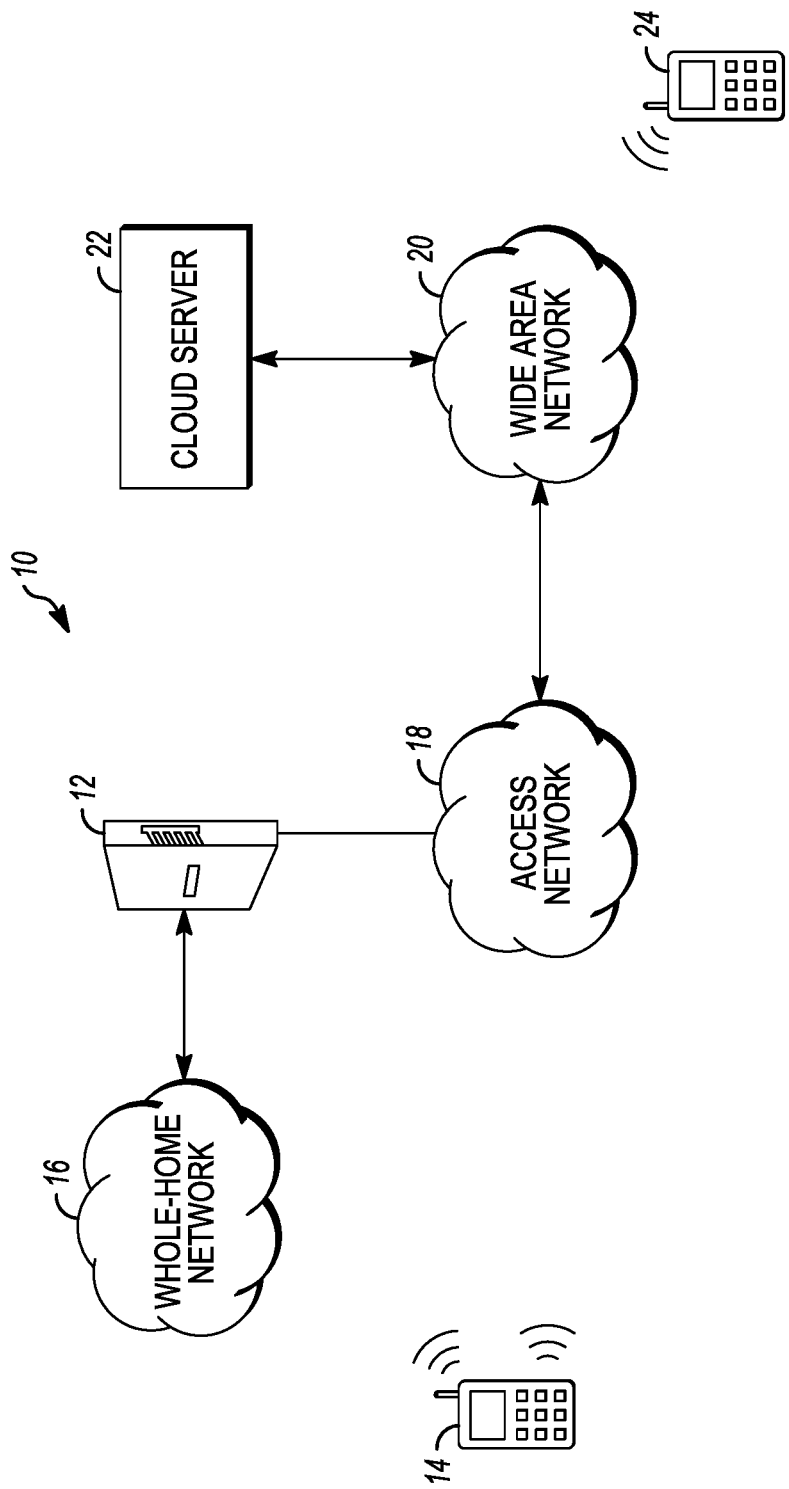
FIG. 1 is a schematic view of a secure home local area network, an edge network device, and external networks in accordance to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

For purposes of this disclosure, the term "Wi-Fi" as used herein refers to a technology for wireless local area networking with devices, for instance, as based on IEEE 802.11 standards. These standards define various frame types that stations (network interface cards and access points) use for communications, as well as managing and controlling wireless links. A service set identifier (SSID) is a network name which is typically provided as a case sensitive, thirty-two alphanumeric character, unique identifier attached to the header of packets sent over a wireless local area network (WLAN). The SSID differentiates one WLAN from another, so all access points and all devices attempting to connect to a specific WLAN must use the same SSID to enable effective roaming.

Gateways (GW), router devices, and modems, for instance, are common network devices and customer premises equipment (CPE) used to regulate network traffic across a network or between two or more separate networks, such as a home WLAN and another network (i.e., an access network, wide area network, the Internet, or like external network). Typically, at least two network cards are installed into each network device, and the network device may be placed between two different networks such that one network card is attached to each network.

For purposes of this disclosure, a gateway (GW) device, in particular, is defined as a hardware and/or software device that acts as a "gate" between two separate networks. It may itself be a router and/or include other devices that enable traffic to flow in and out of a local area network, such as a WLAN. While a gateway may protect nodes embedded within a home network, it also may be a node of the home network. The gateway node is typically considered to be on an "edge" of the network as all data must flow through it before coming in or going out of the local area network, such as a home WLAN A gateway may translate data received from outside networks into a format or protocol recognized by devices within the home local network. A router can be a common type of gateway used in home networks. It allows computers within the local network to send and receive data over the Internet. Typically, gateways enable the regulation of traffic between two dissimilar networks, while router devices are limited to regulating traffic between similar networks.

A Media Access Control (MAC) address whitelist provides an example of a network security measure. A MAC address is a hardware identification number that uniquely identifies each client device and each node on a network. The MAC address whitelist provides an inventory of known MAC addresses that are to be permitted or denied access to an otherwise private WiFi network. For example, if an owner has two smartphones and one laptop that connect to a home WiFi network, then the MAC address of each client device would be added to the MAC address whitelist of the router or like hardware component of the WiFi network to permit such client devices to gain access to the network. A client device having a MAC address that is not on the whitelist or on a so-called blacklist would be denied access to the network.

A problem with the use of MAC address whitelists and/or blacklists is that such lists are typically required to be initially set up manually by the owner, operator, or user of the network. Setting up MAC address security requires the user to retrieve a MAC address from each device to be added to a list. Often, MAC addresses are hidden on an obscure network setup screen or the like, and many client devices have multiple MAC addresses thereby making it unclear to the user as to which one should be used. Further, to enter a MAC address into a modem or like device, the user may be required to manually enter twelve or twenty-four-digit codes of the MAC address number into the modem's MAC address entry security screen without error. Even if one digit is in error, this will cause an unsuccessful connection.

Thus, according to an embodiment as explained in greater detail below, a whitelist authentication security system, such as a MAC address whitelist authentication security system, is used to prevent unwanted access of unauthorized client devices to a secure private network, such as a home WLAN. According to some contemplated embodiments, the whitelist may be provided as a second or subsequent factor of a two-factor or multi-factor authentication security system of the secure network (i.e., the first factor may be provided by password authentication or other security system). In addition, a blacklist (i.e., a list of known devices to be denied access) may also be used in place of the whitelist (i.e., a list of known devices to be granted access), in combination with the whitelist, or as part of the whitelist.

According to an embodiment, a network device, such as customer premise equipment (CPE), a gateway device, a router, a WiFi router or the like, is configured to automatically detect when a new or unrecognized client device attempts to gain access to a secure network and to automatically initiate the whitelisting and/or blacklisting authentication security feature. In a single-factor authentication system, this would occur immediately each time a new or unrecognized client device attempts to gain access to the secure network. In a two-factor or multi-factor authentication system, the detection may occur only after the client device has successfully passed a first factor or level of security or several factors or levels of security. For instance, in a two-factor security system, the first factor may be provided by password protection authentication and require the correct entry of a secret or private password before the new or unrecognized client device is detected as described above.

By way of example, FIG. 1 provides a block diagram illustrating an example home network environment 10. The customer premise equipment (CPE) device 12 (i.e., a gateway) can route communications to and from one or more client devices 14 which can communicate with the CPE device 12 via Wi-Fi communications via connection to the home wireless network 16 (e.g., wireless local area network (WLAN), etc.). The CPE device 12 can route communications between client device 14 and a wide area network (WAN) 20 via an access network 18. In embodiments, the access network 18 may include various networks such as coaxial cable, optical fiber, twisted pairs, wireless networks including 4G and LTE, and others. In embodiments, a WAN 20, for example, can operate using internet protocol (IP) directing data packets to and receiving data packets from the CPE device 12. As discussed below, the CPE device 12 may transmit and receive electronic messages over the Internet to and from a cloud server 22 or to and from an electronic client device 24 owned by a manager of the home network 16 (i.e., via text message, email, communications via an app, or the like).

According to an embodiment, if the client device 14 is a new or previously unrecognized client device by the CPE device 12 (i.e., the client device has not previously requested access to the network 16), the CPE device 12 detects the client device 12 is new or unrecognized without any previous or current interaction required by the human owner or operator of the secure network. By way of example, if a new or unrecognized client device utilizes a correct password needed to pass a first-factor (i.e., password protection) of a two-factor authentication process, the detection of the new or unrecognized client device by the CPE device 12 occurs after the first factor is passed. The detection itself does not necessarily result in the client device 14 successfully gaining access to the secure network; rather, this simply initiates a second-factor of authentication as described below.

Figure 2A:
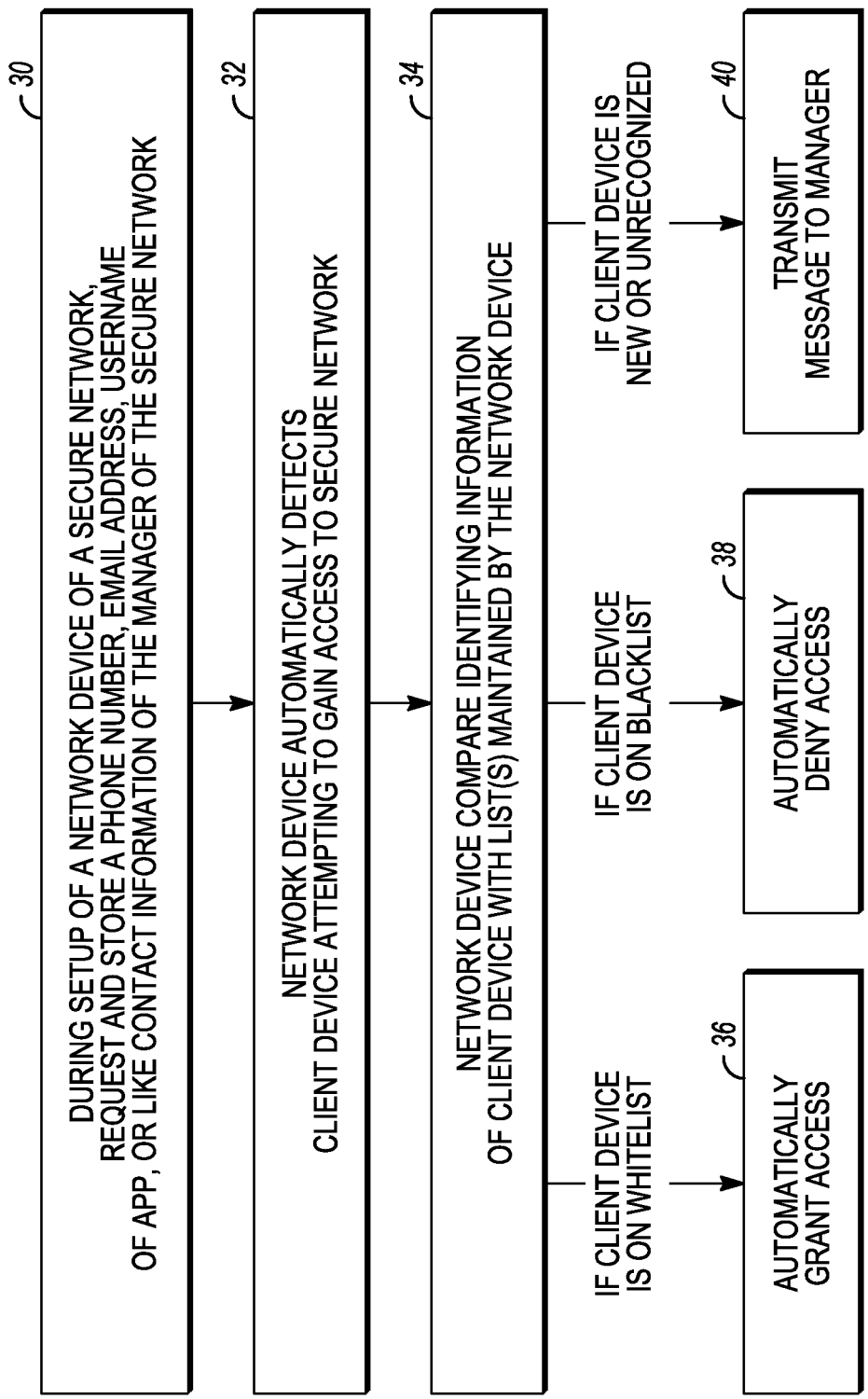
FIGS. 2A and 2B provide a flow chart of a method of authenticating an electronic client device for purposes of granting/denying access to a secure home network in accordance to an embodiment.
Figure 2B:
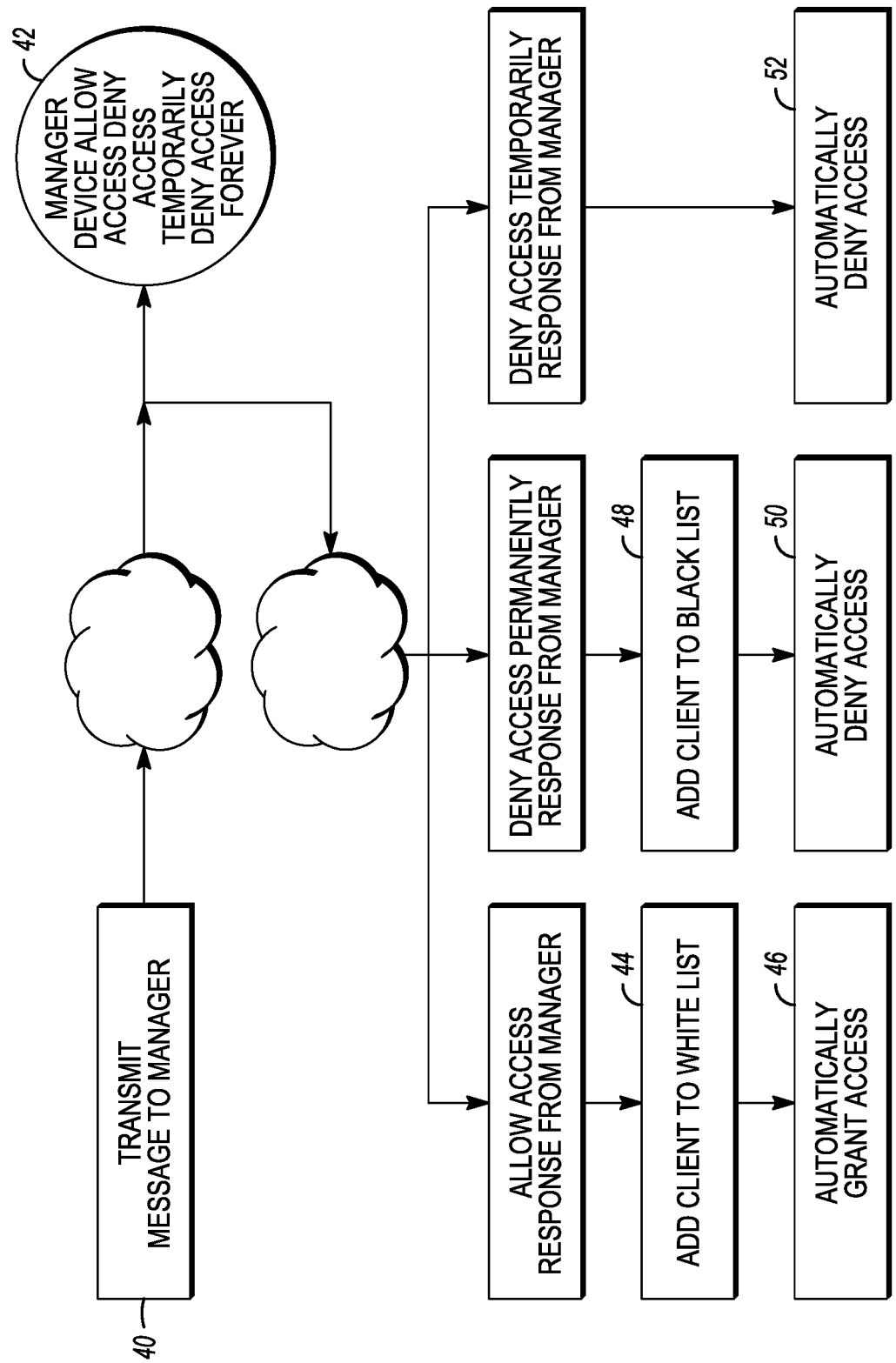

According to an embodiment as shown for instance in FIGS. 2A and 2B, an owner, operator, or manager of a network 16 enters a phone number, email, or the like address, into a CPE, modem, router, gateway or like network device during a simple setup procedure of the network device. See step 30 in FIG. 2A. During the setup procedure, the CPE or network device 12 may require an initial reply from the owner via the entered phone number or the like before completing the setup procedure to ensure that the setup of communication with the manager is functional. For instance, a reply text message or the like from the manager's client device 24 may be required.

Thereafter, when client device 14 attempts to gain access to the network 16, the CLE device detects this attempt (see step 32 in FIG. 2A) and the CLE device 12 compares the identifying information of client device 14 relative to a list(s) of known client devices maintained by the CPE device 12 (see step 34 in FIG. 2A). If the client device is a known client device on a whitelist of authorized client devices, the client device is granted access to the network (see step 36 in FIG. 2A). If the client device is a known client device on a blacklist of unauthorized client devices, the client device is denied access to the network (see step 38 in FIG. 2A). If the client device is considered a new or otherwise unrecognized client device (that may have successfully passed the first or other intermediate factors of security protection), the CPE device 12 automatically triggers another factor or level of security before access is granted and without yet requiring interaction by the manager, owner, or operator of the secure home network 16.

This embodiment uses a gateway or like network device's internal knowledge of the traffic on the secure home network to automate a whitelist or like security feature while avoiding procedures requiring the human owner or manager of the network to initially log into a website or the like and manually setup a whitelist/blacklist with MAC addresses or the like.

The phone number, email, or the like address initially entered by the manager during a set up procedure of the CPE device 12 provides the CPE device, such as a gateway, with a means of directing electronic communications to the owner, operator or manager of the secure network 16. For instance, the phone number of the operator's cellular phone could be entered or an email address of the owner could be utilized. For this purpose, the CPE, gateway, or network device 12 may include software, an app, or a module enabling it to send and receive text messages, emails, or other electronically messages. Alternatively, since the CPE device has a direct connection to the Internet or other network, the CPE, gateway, or network device 12 may be configured to communicate with a cloud server 22 or like external device that sends and receives electronic messages relative to the owner and then relays the owner's response to the CPE, gateway, or like network device 12.

The manual set up of information needed to create a whitelist and/or blacklist, such as a MAC address whitelist and/or blacklist, is not required. Rather, every time a new or otherwise unrecognized client device, such a smartphone, smartwatch, wearable device, smart television, tablet computer, lap-top computer, smart appliance, computer, wireless personal electronic device, or other wireless or wired electronic device is detected as attempting to gain access to the secure network, the detecting CPE, gateway, or network device 12 automatically causes a text message, email, or like electronically-transmitted message to be sent to the owner, operator or manager of the network 16. For example, the message may be sent to the manager's client device 24 via a message sent over the Internet. See step 40 in FIGS. 2A and 2B. Upon receipt of the message, the owner or operator may respond to authorize the new or unrecognized client device to gain access to the network or to temporarily or permanently deny access of the new or unrecognized client device to the secure network (see step 42 in FIG. 2B). By way of example, the response may be by way of a return text message, return email, or by activating a button or the like presented to the manager on client device 24 via an app or like input screen. As shown in FIG. 2B, these communications can be transmitted over the Internet or other external network.

If access is granted, the network device automatically adds the MAC address or like identification information of the new client device to the whitelist and subsequent normal operation and access to network may begin for this newly authorized client device. See steps 44 and 46 of FIG. 2B. Thus, any future attempts by the newly authorized client device to gain access to the secure network will be automatically permitted as an authorized client device without requiring interaction from the manager or owner of the secure network. See step 36 of FIG. 2A.

Alternatively, if access is denied on a substantially permanent basis by the owner, the MAC address or like identifying information of the new client device is not added to the whitelist and the newly designated unauthorized client device is prevented from accessing the secure network. As an option, the MAC address or like identifying information of the newly designated unauthorized client device may be added to a so-called blacklist so that all future attempts by the newly designated unauthorized client device to gain access to the network would be denied automatically without any further interaction with the manager, operator or owner of the secure network. See steps 48 and 50 of FIG. 2B and step 38 in FIG. 2A.

As another possible option, the owner may respond to temporarily deny access to the client device. In this case, identifying information would not be added to the blacklist; rather, access would simply be denied. See step 52 in FIG. 2B.

In the above described manner, the network device 12 automatically maintains a whitelist of authorized client devices used in the home WLAN or like network and may also maintain a blacklist of known client devices designated as unauthorized. Each time the network device 12 detects a new MAC address or other identifying information of an unrecognized client device attempting access to the secure network (i.e., a client device having identifying information that is not included on the whitelist or blacklist maintained by the network device 12), the network device blocks access to the client device and automatically triggers the text or like electronic message to the stored phone number or like address of the network owner or operator.

Thus, in one contemplated embodiment, a first level or factor of security may be provided by proper entry of a password. If the first level or factor of security is passed by a client device, the second level or factor of security as discussed above is initiated (i.e., detection of client device, check of whitelist or blacklist for previously recognized client devices to grant or deny access, or message transfer with owner to grant/deny access for unrecognized client devices and addition of client device on a list).

As discussed above, the electronic message may be a text message sent to the entered telephone number of the network owner's cell phone. Thus, the owner should be able to approve such a request despite not being at home or within range of the home WLAN coverage (i.e., the owner or operator may be away from the home network). Of course, an email address or like electronic address could be used instead of a telephone number. In this way, an email could be sent to the network owner. Of course, other electronic messaging may also be utilized with the use of a username and special app or the like.

The owner may reply by way of return text message or email. Alternatively, the text message or email may cause an app or notification on the owner's electronic device to request a button to be touched or pressed for purposes of granting or denying access. Thus, the returned message or response may be by text message (i.e., 1 if accepted, 2 if denied, etc.), email, entry on an app or like operator control screen, or by any other notification or messaging type. However, the owner or operator is never required to obtain and manually enter a MAC address or like device identifying information into the network device. The CPE, gateway, or network device 12 may permit the owner to manually remove, add and/or transfer a client device on the whitelist and/or blacklist by accessing an app or like operator control screen, if desired, for purposes of correcting a previous response submitted in error or otherwise. Thus, if a client device was initially denied by mistake, it can later be granted access.

Accordingly, the embodiments disclosed above utilize a whitelist and/or blacklist created automatically by a network device such that the network device automatically triggers and causes an alert to be sent to a manager of the network that a new unrecognized client device is attempting to gain access to the network (i.e., via successful entry of a secretly held private password or the like). Thus, the attempt to access the secure network by a new unrecognized client device is the triggering event that provides an update opportunity of the whitelist and/or blacklist of the network device. In turn, the owner or operator of the operator may then cause the identifying information of the unrecognized client device to be automatically added to a whitelist or a blacklist of the network device via simple yes/no response. Thereafter, the network device will automatically permit or prevent present and future access to the secure network by this client device.

Thus, a two-step or multi-step authorization system may be provided requiring only minimal involvement of the manager, operator, or owner of the network. The two-step or multi-step authorization process provides a high level of security and prevents hackers with the ability to steal passwords from undesirably gaining access to privately held secure networks.

A system for carrying out any of the above disclosed embodiments, methods, or arrangements may include software or the like provided on a circuit board or within another electronic device and can include various routers, modems, processors, microprocessors, modules, units, components, controllers, chips, disk drives, and the like. It will be apparent to one of ordinary skill in the art that gateways, routers, modems, systems, modules, components, units, processors, servers, and the like may be implemented as electronic components, software, hardware or a combination of hardware and software for purposes of providing a system.

Figure 3:
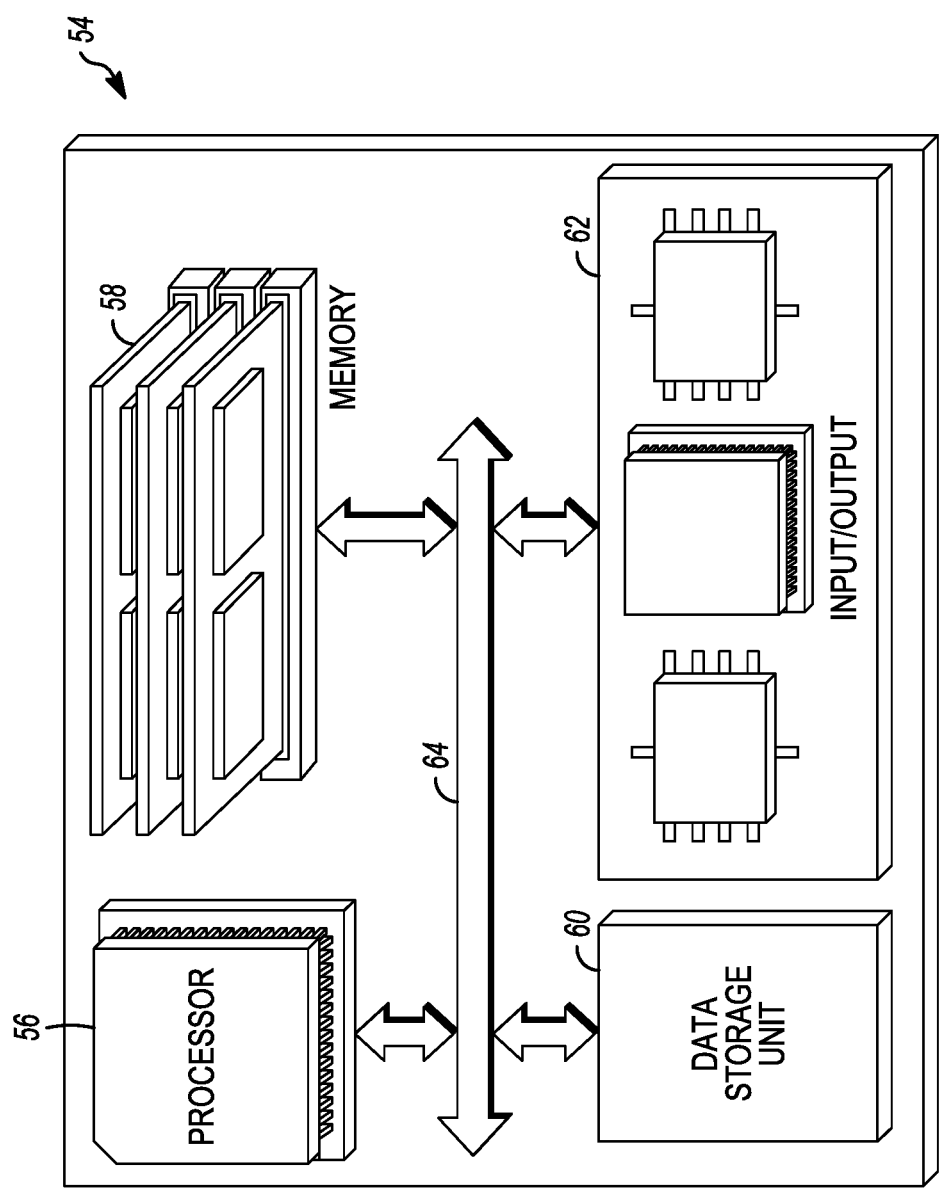
FIG. 3 is a schematic view of an edge network device in accordance to an embodiment.

By way of example, FIG. 3 is a block diagram of a hardware configuration of a CPE device 54. It should be understood that the hardware configuration may exist in various types of devices, such as gateways, extenders, and the like. The hardware configuration may include a processor 56, memory 58, a storage device 60, an input/output device 62, and the like. Each of the components 56, 58, 60 and 62, for example, may be interconnected using a system bus 64 or the like. The processor 56 may be capable of processing instructions for execution within the hardware configuration and may be capable of processing instructions stored in the memory 58 or on the storage device 60. The processor 56 may be configured to carry out any of the processes or steps discussed above.

The input/output device 62 provides input/output operations for the hardware configuration. In embodiments, the input/output device 62 may include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., wholehome network 16 of FIG. 1, access network 18 of FIG. 1, etc.).

Embodiments may also include at least one non-transitory computer readable storage medium having computer program instructions stored thereon that, when executed by at least one processor, can cause the at least one processor to perform any of the steps described above.

While the principles of the invention have been described above regarding specific devices, apparatus, systems, and/or methods, it is to be clearly understood that this description is made only by way of example and not as limitation. One of ordinary skill in the art will appreciate that various modifications and changes can be made without departing from the scope of the claims below.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims.

I claim:

1. A method of authenticating a client device for purposes of granting/denying access to a secure network, comprising the steps of:
   automatically detecting with a network device of the secure network an attempt by the client device to access the secure network;
   determining that the client device has passed a first-factor of a multi-factor authentication security system;
   automatically detecting with the network device of the secure network the client device requesting access to the secure network as unrecognized based on a comparison of the client device to a list maintained by the network device such that the client device has not previously requested access to the secure network;
   automatically blocking with the network device access to the secure network by the client device based on the client device being detected as unrecognized;
   automatically causing a message in electronic form to be sent from the network device to a device of a manager of the secure network based on the client device being detected as unrecognized as another level of security, the message seeking a response from the manager as to whether access to the unrecognized client device should be granted or denied, wherein the device is based on an input from the manager during a setup procedure;
   receiving the response from the device of the manager; and
   automatically adding identification information of the unrecognized client device to the list of known client devices when the response is received by the network device and granting or denying access based on the response.

2. The method according to claim 1, wherein the identification information is a Media Access Control (MAC) address of the client device.

3. The method according to claim 1, wherein the list includes a whitelist of identification information of known client devices that are automatically to be granted access to the secure network by the network device.

4. The method according to claim 1, wherein the list includes a blacklist of identification information of known client devices that are automatically to be denied access to the secure network by the network device.

5. The method according to claim 1, wherein the message is selected from the group consisting of a text message sent to a phone number of the manager, an email sent to an email address of the manager, or an electronic message sent to an app accessible by the manager.

6. The method according to claim 5, further comprising the step of requesting a phone number, email address, or username of an app to be input by the manager during setup of the network device.

7. The method according to claim 1, wherein the secure network is a wireless local area network (WLAN), wherein the network device is customer premise equipment (CPE), a gateway device, or a WiFi router of the secure network that has access to the Internet, and wherein the network device transmits the message to the manager via the Internet.

8. The method according to claim 1, wherein the network device performs at least one of sending the message and receiving the response.

9. The method according to claim 1, wherein the network device communicates with a cloud server for at least one of having the message sent and having the response received.

10. The method according to claim 1, wherein said steps of detecting that the client device as unrecognized, causing, and adding are part of a single factor of the multi-factor authentication security system for granting or denying access to client devices to the secure network.

11. The method according to claim 10, wherein said steps of detecting that the client device as unrecognized, causing, and adding are part of a second or subsequent factor of the multi-factor authentication security system, and wherein the first-factor of the multi-factor authentication security system must be passed before said steps of detecting that the client device as unrecognized, causing, and adding occur.

12. The method according to claim 11, wherein the first-factor requires accurate submission of a pre-set secret password.

13. The method according to claim 1, wherein the client device is selected from the group consisting of a smartphone, smartwatch, tablet computer, lap-top computer, wearable device, smartwatch, smart appliance, smart television, computer, lap top computer, tablet computer, and wireless personal electronic device.

14. A network device of a secure network, comprising:
a memory storing one or more instructions; and
at least one processor configured to execute the one or more instructions to:
automatically detect with the network device of the secure network an attempt by a client device to access the secure network;
determine that the client device has passed a first-factor of a multi-factor authentication security system;
automatically detect that the client device requesting access to the secure network as unrecognized based on a comparison of the client to a list maintained by the network device such that the client device has not previously requested access to the secure network;
automatically blocking with the network device access to the secure network by the client device based on the client device being detected as unrecognized;
automatically cause a message in electronic form to be sent from the network device to a device of a manager of the secure network based on the client device being detected as unrecognized so as to seek a response from the manager as to whether access to the unrecognized client device should be granted or denied, wherein the device is based on an input from the manager during a setup procedure;
receiving the response from the device of the manager; and
automatically add identification information of the unrecognized client device to the list of known client devices when the response is received by the network device.

15. The network device according to claim 14, wherein the secure network is a wireless local area network (WLAN), wherein the network device is customer premise equipment (CPE), a gateway device, or a WiFi router of the secure network that has access to the Internet, and wherein the network device transmits the message to the manager via the Internet.

16. The network device according to claim 14, wherein the list includes at least one of a whitelist of identification information of known client devices that are automatically to be granted access to the secure network by the network device and a blacklist of identification information of known client devices that are automatically to be denied access to the secure network by the network device.

17. The network device according to claim 14, wherein the identification information is a Media Access Control (MAC) address of the client device.

18. The network device according to claim 14, wherein the message is selected from the group consisting of a text message sent to a phone number of the manager, an email sent to an email address of the manager, or an electronic message sent to an app accessible by the manager, and wherein the at least one processor is configured to request entry of a phone number, email address, or username of an app by the manager during setup of the network device.

19. The network device according to claim 14, wherein the at least one processor is further configured to execute the one or more instructions to directly send the message and receive the response.

20. The network device according to claim 14, wherein the at least one processor is further configured to execute the one or more instructions to provide the multi-factor authentication security system for granting or denying access to client devices to the secure network, and wherein the multi-factor authentication security system includes the first-factor requiring accurate submission of a pre-set secret password, and wherein a second or subsequent factor of the multi-factor authentication security system is provided by the list maintained by the network device.

* * * * *